(12) United States Patent
Park et al.

(10) Patent No.: US 9,064,523 B2
(45) Date of Patent: Jun. 23, 2015

(54) METHOD AND APPARATUS FOR CONTROLLING CONTENT RECORDING DEVICE

(75) Inventors: Sung-jin Park, Suwon-si (KR);
Kwang-kee Lee, Seoul (KR); Eun-hee Rhim, Yongin-si (KR); In-chul Hwang, Suwon-si (KR); Glenn A. Adams, Cambridge, MA (US)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 810 days.

(21) Appl. No.: 12/177,903

(22) Filed: Jul. 23, 2008

(65) Prior Publication Data

US 2009/0097827 A1    Apr. 16, 2009

(30) Foreign Application Priority Data

Oct. 16, 2007   (KR) .................. 10-2007-0103883

(51) Int. Cl.
  *H04N 9/80*      (2006.01)
  *H04N 5/92*      (2006.01)
  *H04N 5/93*      (2006.01)
  *G11B 19/02*     (2006.01)
  *H04N 5/76*      (2006.01)
  *H04N 5/783*     (2006.01)

(52) U.S. Cl.
  CPC .................. *G11B 19/02* (2013.01); *H04N 5/76* (2013.01); *H04N 5/783* (2013.01)

(58) Field of Classification Search
  CPC ........... G11B 19/02; H04N 5/76; H04N 5/783

USPC ............ 386/46, 200, 234, 239, 248, 291, 299
See application file for complete search history.

(56) References Cited

U.S. PATENT DOCUMENTS

| | | | |
|---|---|---|---|
| 7,155,305 B2* | 12/2006 | Hayes et al. .................. | 700/224 |
| 7,792,920 B2* | 9/2010 | Istvan et al. .................. | 709/217 |
| 2004/0081425 A1* | 4/2004 | Stone et al. ..................... | 386/46 |
| 2004/0128399 A1 | 7/2004 | Kurrasch | |
| 2005/0096753 A1* | 5/2005 | Arling et al. .................... | 700/11 |
| 2006/0095402 A1* | 5/2006 | Lee et al. ......................... | 707/1 |
| 2007/0005727 A1* | 1/2007 | Edwards et al. ............... | 709/218 |
| 2007/0044015 A1* | 2/2007 | Ikeda ............................. | 715/517 |
| 2007/0198654 A1 | 8/2007 | Matsuoka | |
| 2007/0250863 A1* | 10/2007 | Ferguson ........................ | 725/46 |

(Continued)

FOREIGN PATENT DOCUMENTS

| | | |
|---|---|---|
| EP | 1271350 A1 | 1/2003 |
| JP | 2002-288134 A | 10/2002 |
| JP | 2003-162449 A | 6/2003 |

(Continued)

OTHER PUBLICATIONS

Communication dated Feb. 27, 2012 issued by the State Intellectual Property Office of P.R. China in counterpart Chinese Patent Application No. 200880109771.7.

(Continued)

*Primary Examiner* — Chau Le
(74) *Attorney, Agent, or Firm* — Sughrue Mion, PLLC

(57) ABSTRACT

A method of controlling a content recording device, by generating control commands in a uniform resource identifier (URI) format and controlling the content recording device according to the generated control command(s), is provided.

18 Claims, 3 Drawing Sheets

(56) References Cited

U.S. PATENT DOCUMENTS

2008/0134049 A1* 6/2008 Gupta et al. .................. 715/738
2008/0298268 A1* 12/2008 Chiba et al. .................. 370/252

FOREIGN PATENT DOCUMENTS

| JP | 2006-259989 A | 9/2006 |
| JP | 2006-303617 A | 11/2006 |
| JP | 2007-228205 A | 9/2007 |

OTHER PUBLICATIONS

Communication dated Jun. 12, 2012 issued by the European Patent Office in counterpart European Patent Application No. 08766366.2.
Communication dated Jun. 28, 2012 issued by the European Patent Office in counterpart European Patent Application No. 08766366.2.
Communication dated Mar. 27, 2013 issued by the State Intellectual Property Office of P.R. China in counterpart Chinese Patent Application No. 200880109771.7.
Communication dated Apr. 5, 2013 issued by the Mexican Patent Office in counterpart Mexican Patent Application No. MX/a/2010/003811.
Communication dated Dec. 25, 2012 issued by the State Intellectual Property Office of the People's Republic of China in Chinese Application No. 200880109771.7.
Communication dated Nov. 27, 2013, issued by the Mexican Patent Office in counterpart Mexican Application No. MX/a/2010/003811.
Communication dated Jan. 9, 2014, issued by the State Intellectual Property Office of the People's Republic of China in counterpart Chinese Application No. 200880109771.7.

* cited by examiner

FIG. 1

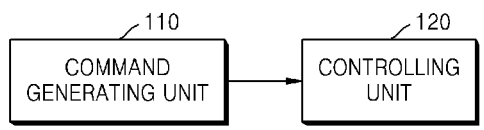

FIG. 2

Request
GET pvr:///resolve?type=crid+id=crid%3A//broadcaster.co.jp;comedy/wibble HTTP/1.1
Response
HTTP/1.1 303 See Other
Location: pvr:///01abc9362/info

FIG. 3

| | |
|---|---|
| pvr:///01abc9362/play?rate=1.0 | ; 1x forward |
| pvr:///01abc9362/play?rate=2.0 | ; 2x forward |
| pvr:///01abc9362/play?rate=-1.0 | ; 1x reverse |
| pvr:///01abc9362/play?rate=-2.0 | ; 2x reverse |
| pvr:///01abc9362/play?rate=1.0fps | ; step forward (1 frame/sec) |
| pvr:///01abc9362/play?rate=-1.0fps | ; step reverse (1 frame/sec) |
| pvr:///01abc9362/play?rate=0 | ; pause |
| pvr:///play?resume | ; if paused, then resume at previous rate (at pause time) |

FIG. 4

| | |
|---|---|
| pvr:///seek?position=+1ch | ; seek forward one chapter |
| pvr:///seek?position=1ch | ; seek to chapter one |
| pvr:///seek?position=-2ch | ; seek reverse two chapters |
| pvr:///seek?position=+30s | ; seek forward 30 seconds |
| pvr:///seek?position=-30s | ; seek reverse 30 seconds |
| pvr:///seek?position=0s | ; seek to 0 seconds position (of entire content unit) |
| pvr:///seek?position=end | ; seek to end of entire content unit |

FIG. 5

| | |
|---|---|
| pvr:///01abc9362/record | ; start recording now |
| pvr:///01abc9362/record?begin=1800s | ; start recording at 1800 seconds |
| pvr:///01abc9362/record?end=1800s | ; start recording now and stop at 1800s |
| pvr:///01abc9362/record?expire=7d | ; expire in 7 days |

METHOD AND APPARATUS FOR CONTROLLING CONTENT RECORDING DEVICE

CROSS-REFERENCE TO RELATED PATENT APPLICATION

This application claims priority from Korean Patent Application No. 10-2007-0103883, filed on Oct. 16, 2007, in the Korean Intellectual Property Office, the disclosure of which is incorporated herein in its entirety by reference.

BACKGROUND OF THE INVENTION

1. Field of the Invention

The present invention relates to a method and an apparatus for controlling a content recording device.

2. Description of the Related Art

A personal video recorder is a type of digital recording apparatus that records information into and plays content back from a recordable medium such as a hard disk drive, in contrast to an apparatus such as a video cassette recorder (VCR) which store video data on a magnetic tape. Such a personal video recorder is a new-generation recording apparatus capable of recording a broadcasted program for a set amount of time depending on the capacity of the recording apparatus by using a hard disk drive, included in a set top box or a television, or other recording devices without a VCR.

Personal video recorders operate in response to a control command. However, the format of the control command has been varied according to a manufacturer of a personal video recorder hitherto.

Therefore, controlling the personal video recorders from different manufacturers has been inconvenient due to control commands in formats different from one to another, and it has been difficult for a user to recognize the control commands intuitively and to input the control commands directly due to complicated formats.

SUMMARY OF THE INVENTION

The present invention provides a method and an apparatus for controlling a content recording device by using control commands having an intuitive and convenient-to-input format.

According to an aspect of the present invention, there is provided a method of controlling the content recording device, including generating control commands in a uniform resource identifier (URI) format and controlling the content recording device according to the generated control commands.

A control command may include at least one of a device identifier specifying a content recording device to be controlled, a port number specifying a port to be used for communication by the content recording device, a content identifier specifying content to be used in the content recording device, and an operating command specifying an operation to be carried out by the content recording device.

The operating command may further include commands for applying conditions when the operation is being carried out.

The operating command may specify at least one of outputting a list of contents usable in the content recording device, outputting additional information about content, playing back content, ceasing playback of content, recording content, specifying the playback location within content, deleting content, and deactivating encryption technology or digital rights management (DRM) technology applied to content. The method of controlling the content recording device may further include selecting at least an operation to be carried out by the content recording device and content to be used in the content recording device, and the control commands may be generated thereafter according to the selection.

The method of controlling the content recording device may further include converting a format of the selected content identifier to a format specifically defined in the control commands when the specific content identifier format is defined in the control commands and the format of the content identifier of the selected content differs from the specific format defined in the control commands.

The control commands may be composed using at least one of numbers, characters, and symbols.

According to another aspect of the present invention, there is provided a controlling device of the content recording device including a command generating unit generating control commands in the URI format and a controlling unit controlling the content recording device according to the generated command.

The controlling device of the content recording device may further include a user interface which may receive a signal to select at least an operation to be carried out by the content recording device and content to be used in the content recording device, and the control commands may be generated in the command generating unit according to the selection made by the signal.

The controlling device of the content recording device may further include a format converter converting a format of the selected content identifier to a format specifically defined in the control commands, when the specific content identifier format is defined in the control commands and the format of the content identifier of the selected content differs from the specific format defined in the control commands.

According to another aspect of the present invention, there is provided a computer readable recording medium having recorded thereon a computer program for executing the method of controlling the content recording device, including the generation of control commands using the URI format and the control of the content recording device according to the generated control commands.

BRIEF DESCRIPTION OF THE DRAWINGS

The above and other features and advantages of the present invention will become more apparent by describing in detail exemplary embodiments thereof with reference to the attached drawings in which:

FIG. 1 is a diagram of a control device for a content recording device according to an exemplary embodiment of the present invention;

FIG. 2 is a reference of control commands according to an exemplary embodiment of the present invention;

FIG. 3 is a reference of control commands according to another exemplary embodiment of the present invention;

FIG. 4 is a reference of control commands according to another exemplary embodiment of the present invention;

FIG. 5 is a reference of control commands according to another exemplary embodiment of the present invention.

DETAILED DESCRIPTION OF THE INVENTION

Figure 6:
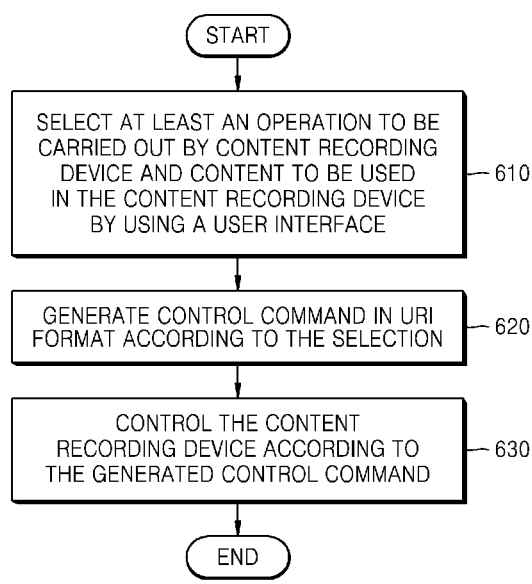
FIG. 6 is a flow chart of a method of controlling a content recording device according to an exemplary embodiment of the present invention.

Hereinafter, the present invention will be described in detail by explaining exemplary embodiments of the invention with reference to the attached drawings.

FIG. 1 is a diagram of a control device for a content recording device according to an exemplary embodiment of the present invention.

Referring to FIG. 1, the controlling device includes a command generating unit 110 and a controlling unit 120.

The command generating unit 110 generates a control command using a uniform resource identifier (URI) format.

A URI represents character strings used to identify a resource, and a uniform resource locator (URL), used to locate resources on a network such as the internet, is a subordinate concept of the URI. Popularization of the internet has resulted in frequent use of the URLs. For example, a URL may be as shown in Example 1 and be used to locate a web portal site, namely Google.

Example 1 http://www.google.com

In the URL shown in Example 1, 'http' represents a communication protocol used to transmit a hypertext document between a web server and an internet browser on the internet. A user is able to get on a website he or she wants to by inputting a URL, such as that shown in Example 1, into an internet search window.

The present invention may contribute to user convenience by enabling intuitive recognition and control of the content recording device according to convenient-to-input control commands generated using the commonly and widely used URI format.

Also, since the control commands in the URI format can be generated without difficulty, the control commands in URL format may be introduced to content recording devices from various manufacturers, thus the control commands in the URI format is advantageous in terms of compatibility.

In point of fact, the term 'content recording device' used in the present invention includes all devices capable of recording and playing back content such as a personal computer (PC), an internet protocol television (IPTV), and a personal video recorder.

Once the control command is generated in the command generating unit 110, the controlling unit 120 controls the content recording device according to the generated control command.

In this case, the operations of the controlling unit 120 may include outputting a list of contents usable in the content recording device, outputting additional information about the content, playing back the content, ceasing playback of the content, recording the content, specifying a playback location in the content, or deleting the content.

Hereinafter, a control command generated using the URI format according to an exemplary embodiment of the present invention is described with reference to Example 2. However, the control command is not limited to the example shown in Example 2, and may further include at least one of numbers, characters, and symbols based on URL format.

Example 2

"pvr:///"[host[":"port]]["/"content-id]["/"operation ["?"operands]]

The terminologies shown in Example 2 are described below.

In the "pvr:///" part, 'pvr' indicates that the command is for a content recording device.

In the [host[":"port]] part, 'host' represents a device identifier for specifying a content recording device to be controlled according to the control command shown in Example 2, and the 'port' represents the number of a port to be used for communication by the content recording device. The 'host' and 'port' are included in brackets, and the brackets mean that such codes may be omitted. When both of the 'host' and 'port' are omitted, the content recording device which received the control command may be specified as the device to be controlled according to a default value.

However, if a specific device identifier is described as a host in the [host[":"port]], a device corresponding to the device identifier may be controlled according to the control command.

For example, when a PC and a TV are available as content recording devices and the user orders the PC to display moving pictures on the TV via the PC's user interface, the PC generates a control command in URL format, in which a device identifier for TV is used, in response to the order.

The user interface may be displayed in graphics, that is, a graphic user interface (GUI), but may also be arranged as a direct-input interface in which a user may input control commands directly. For example, while a user may select specific content for playback of various contents shown as graphics on a display of a user interface via a device such as a remote controller, the user may also directly input control commands in the URI format via a device such as a keyboard into the user interface allowing direct input of the control command.

The controlling device of the content recording device according to an exemplary embodiment of the present invention may further include a user interface (not shown) to receive input from a user.

Returning to Example 2, the code 'content-id' in the ["/"content-id] part represents the content identifier specifying content to be used in the content recording device. The code 'content-id' may be omitted in the control command, and content to be used in the content recording device may be selected according to a default value. For example, most recently played content or all contents may be selected according to a default value.

Meanwhile, when the content recording device is an IPTV, a list of contents may be displayed by using a user interface provided by the IPTV, and a user may select content to play back from the output list of contents via the user interface. Once content is selected, a content identifier corresponding to the content may be described in the 'content-id' of the control command shown in Example 2.

While the content identifier may be composed using various formats, a specific format may be defined in control command. For example, a content identifier may be "01abc362" which is composed of five numbers and three letters, but the format is not limited thereto and may be composed using a plurality of numbers, characters, or symbols.

If a control command defines a specific format of the content identifier, converting a format of the content identifier of the content selected via the user interface into the format defined in the control command may be further performed if the format of the content identifier of the selected content is different from the format defined in the control command.

The controlling device for the content recording device according to an exemplary embodiment of the present invention may further include a format converter (not shown) converting a format of the content identifier of the selected content to a format specifically defined in the control commands, when the format of the content identifier of the selected content differs from the specific format defined in the control commands.

A description of the format converting process is given below in a description of the code 'operation' from Example 2.

In the ["/"operation["?"operands]] part, the code 'operation' represents a command commanding the content recording device to carry out an operation, and the code 'operands' represents a command regarding conditions to be applied when an operation specified in the code 'operation' is being carried out.

If both the 'operation' code and 'operands' code are omitted, a default value is set as the 'operation' code and the 'operands' code. For example, a command commanding content playback may be set as a default value.

As shown in Example 3, the 'operation' code may include nine injunctions. However, the number of injunctions to be included in the 'operation' code is not limited thereto, and may include more injunctions for more operations.

Example 3

Operation

'list', 'info', 'resolve', 'delete', 'play', 'stop', 'seek', 'record', 'scpct'

In Example 3, 'list' is an injunction commanding the content recording device to display a list of contents, and may be in a format such as the format shown in Example 4.

Example 4 pvr:///list?format=html pvr:///list?format=xml+schema=SVG pvr:///list?format=html+actor=contains(eastwood)+ title=contains(harry)

The first control command shown in Example 4 is a command commanding the content recording device to display a list of contents using HTML format. In this case, the HTML format includes a simplified CE-HTML format to be used in consumer electronics (CE) devices.

The second control command shown in Example 4 is a command commanding the content recording device to display the list of contents using extensible markup language (XML) format and scalable vector graphics (SVG) format together.

The third control command shown in Example 4 is a command commanding the content recording device to display a list of specific contents satisfying set conditions of all contents. More particularly, it is a command commanding the content recording device to display a list of specific contents, including the word 'eastwood' for the name of an actor and the word 'harry' for the title of the content, using HTML format. The 'list' injunction may further include injunctions for applying conditions to the operation of displaying a list of contents; examples of the conditional injunctions are 'director', 'actor', 'title', 'description', 'rating', etc.

In Example 3, 'info' is an injunction commanding the content recording device to display additional information about content, and may be in a format such as the format shown in Example 5.

Example 5 pvr:///01abd9362/info?format=html

In Example 5, '01abd9362' is a content identifier, and the control command shown in Example 5 is a command commanding the content recording device to display additional information about the content having the content identifier '01abd9362' in HTML format. It may be set up to display additional information in HTML format according to the default value, even if the code 'format=html' is omitted in the control command.

In Example 3, 'resolve' is an injunction commanding the format converter of the content recording device to convert a format of the content identifier, and may be in a format such as the format shown in Example 6. According to the 'resolve' injunction, the format converter converts the format of the content identifier.

Example 6 pvr:///resolve?type=crid+id=crid %3A//broadcaster.co.jp;comedy/wibble pvr:///01abc9362/info The first control command shown in Example 6 is a command commanding the content recording device to convert the content identifier "id=crid %3A//broadcaster.co.jp;comedy/wibble" to a content identifier in a format defined in the control command.

The second control command shown in Example 6 is an exemplary embodiment of a control command commanding the content recording device to display additional information about the content having the content identifier '01abc9362' which is the content identifier converted and regenerated in the format defined in the control command in response to the first control command.

Meanwhile, the second control command shown in Example 6 can include not only the 'info' injunction but also a 'play' injunction. In this case, the second control command may be a command commanding the content recording device to play back the content having the content identifier '01abd9362.'

FIG. 2 is a reference of control commands according to an exemplary embodiment of the present invention in detail.

FIG. 2 illustrates control commands using a 'resolve' injunction, and the control commands are divided into two sections: a 'Request' section and a 'Response' section.

The 'Request' section of FIG. 2 is a control command that is transmitted to a server using the HTTP 1.1 protocol. That is, the 'Request' section is a command requesting the server to convert a content identifier 'id=crid %3A//broadcaster.co.jp; comedy/wibble' to a content identifier in a format defined in the control command.

The 'Response' section of FIG. 2 is a control command commanding to output additional information about the content having the content identifier '01abc9362' received from the server in response to the 'Request' section.

Therefore, the conversion of the format of a content identifier is performed by the server in this particular case.

In Example 3, 'delete' is an injunction commanding deletion of content.

In Example 3, 'play' is an injunction commanding playback of content.

FIG. 3 is a reference of control commands according to another exemplary embodiment of the present invention in detail.

FIG. 3 illustrates control commands using a 'play' injunction.

Referring FIG. 3, 'rate' is a conditional injunction showing conditions to be applied to the playback speed of content, where '1.0' represents single-speed playback, '2.0' represents double-speed playback, '−1.0' represents single-speed reversed playback, '1.0 fps' represents playback of one frame per second, '−1.0 fps' represents reversed playback of one frame per second, and '0' represents pause of playback.

'Resume' denotes an injunction commanding to resume playback of content if playback of the content has ceased.

In Example 3, 'stop' is an injunction commanding to cease playback of content, and may be in a format such as the format shown in Example 7.

Example 7 pvr:///stop pvr:///stop?reset

The first control command shown in Example 7 is a command commanding to cease playback of content at the current playback location of the content. Therefore, if the content is to resume playback later, the content resumes playback from the location where playback was previously ceased.

The second control command shown in Example 7 is a command commanding reset of the playback location to an initial playback location of the content, that is, the beginning of the content, after playback has ceased.

Meanwhile, it is also possible to generate a command using the 'play' injunction to obtain the same effect as the effect of a command using the 'stop' injunction, as shown in Example 8.

Example 8 pvr:///play?rate=0+dealloc pvr:///play?rate=0+dealloc+reset

The first control command shown in Example 8 corresponds to the first control command shown in Example 7, and the second control command shown in Example 8 corresponds to the second control command shown in Example 7. Therefore, the 'stop' injunction may be omitted in some exemplary embodiments.

In Example 3, a 'seek' is an injunction specifying the playback location within content.

FIG. 4 is a reference of control commands according to another exemplary embodiment of the present invention.

FIG. 4 illustrates control commands using the 'seek' injunction.

Referring FIG. 4, a 'position' is a conditional injunction representing conditions to be applied to specify playback location of content, where '+1ch' specifies the playback location of the content to be at a location one chapter forward from the current location, '1ch' specifies the playback location of the content to be the first chapter, '−2ch' specifies the playback location of the content to be two chapters behind the current location, '+30 s' specifies a playback location of the content to be thirty seconds forward from the current location, and '−30 s' specifies a playback location of the content to be thirty seconds behind the current location.

Meanwhile, '0 s' specifies the playback location of the content to be at the beginning of the content, and 'end' specifies the playback location of the content to be at the end of the content.

In Example 3, 'record' is an injunction commanding a content recording device to record content.

FIG. 5 is a reference of control commands according to another exemplary embodiment of the present invention.

FIG. 5 illustrates control commands using the 'record' injunction.

Referring to FIG. 5, if there is no condition applied to the recording operation of the content, recording will be performed from the current location of the content. However, if conditional injunctions such as 'begin', 'end', and 'expire' are further included, the content will be recorded according to conditions corresponding to the conditional injunctions.

If 'begin=1800 s' is further included in the control command, the content is recorded from a location 1800 seconds after the starting location of the content. If 'end=1800 s' is further included, the content is recorded from the starting location of the content and recording is stopped at a location 1800 seconds after the starting location of the content.

Meanwhile, if 'expire=7 d' is further included in the control command, it means that the term of validity of content will expire seven days after the content is recorded and thus the content must be deleted once the term of validity is exceeded.

In Example 3, 'scpct' is an abbreviation of service and content protection control, and is an injunction deactivating encryption technology or digital rights management (DRM) technology applied to content.

FIG. 6 is a flow chart of a method of controlling a content recording device according to an exemplary embodiment of the present invention In operation 610 shown in FIG. 6, at least an operation to be carried out by the content recording device and content to be used in the content recording device are selected via a user interface.

In operation 620, a control command is generated in the URI format according to the selection.

In operation 630, the content recording device is controlled according to the generated control command.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling a content recording device, comprising:
    at a controlling device, generating a control command in a Uniform Resource Identifier (URI) format, wherein the control command comprises a content identifier that specifies content to be used in the content recording device;
    controlling the content recording device according to the generated control command;
    comparing a first content identifier format of the content identifier of a selected content to a second content identifier format specifically defined in the control command; and
    upon a condition that the first content identifier format and the second content identifier format are different, converting the first content identifier format to the second content identifier format.

2. The method of claim 1, wherein the control command comprises at least one of:
    a device identifier that specifies a content recording device to be controlled according to the control command;

a port number that specifies a port to be used for communication by the content recording device; and an operating command that specifies an operation to be carried out by the content recording device.

3. The method of claim 2, wherein the operating command further comprises commands that apply conditions when the operation is carried out.

4. The method of claim 2, wherein the operating command specifies at least one of:

outputting a list of contents usable in the content recording device;

outputting additional information about content;

playing back content;

ceasing playback of content;

recording content;

specifying playback location in content;

deleting content;

deactivating encryption technologies or digital rights management (DRM) technologies applied to content; and converting a format of the content identifier.

5. The method of claim 2, further comprising selecting at least one of:

an operation to be carried out by the content recording device; and content to be used in the content recording device, wherein the control commands are then generated according to the selection.

6. The method of claim 1, wherein the control commands are composed using at least one of numbers, characters, and symbols.

7. The method of claim 1, wherein the generating comprises composing a specific format of the control command when a determination to issue the control command is made.

8. A controlling device of the content recording device, comprising:

a command generating unit comprising a first hardware processor and the command generating unit generates control commands in a Uniform Resource Identifier (URI) format, wherein the control commands comprise a content identifier that specifies content to be used in the content recording device;

a controlling unit comprising a second hardware processor and the controlling unit controls the content recording device according to the generated commands; and a format converter which compares a first content identifier format of the content identifier of a selected content to a second content identifier format specifically defined in the control command, and, upon a condition that the format converter determines that the first content identifier format and the second content identifier format are different, the format converter converts the first content identifier format to the second content identifier format.

9. The controlling device of claim 8, wherein the control commands comprise at least one of:

a device identifier that specifies a content recording device to be controlled according to the control command;

a port number that specifies a port to be used for communication by the content recording device; and an operating command that specifies an operation to be carried out by the content recording device.

10. The controlling device of claim 9, wherein the operating command further comprises commands for applying conditions when the operation is being carried out.

11. The controlling device of claim 9, wherein the operating command specifies at least one of:

outputting a list of contents usable in the content recording device;

outputting additional information of content;

playing back content;

ceasing playback of content;

recording content;

specifying playback location in content;

deleting content;

deactivating encryption technologies or DRM technologies applied to content; and converting format of content identifier.

12. The controlling device of claim 9, further comprising a user interface comprising a receiver which receives a signal to select at least one of an operation to be carried out by the content recording device and content to be used in the content recording device, wherein the control commands are then generated according to the selection.

13. The controlling device of claim 8, wherein the control commands are composed using at least one of numbers, characters, and symbols.

14. The controlling device of claim 8, wherein the generating the control command comprises composing a specific format of the control command when a determination to issue the control command is made.

15. A non-transitory computer program product including a computer readable recording medium having recorded whereon a computer program for executing instructions including:

generating a control command in a Uniform Resource Identifier (URI) format, wherein the control command comprises a content identifier that specifies content to be used in the content recording device;

controlling the content recording device according to the generated control command;

comparing a first content identifier format of the content identifier of a selected content to a second content identifier format specifically defined in the control command; and upon a condition that the first content identifier format and the second content identifier format are different, converting the first content identifier format to the second content identifier format.

16. The non-transitory computer program product of claim 15, wherein the control command comprises at least one of:

a device identifier that specifies a content recording device to be controlled according to the control command;

a port number that specifies a port to be used for communication by the content recording device; and an operating command that specifies an operation to be carried out by the content recording device.

17. The non-transitory computer program product of claim 16, wherein the operating command further comprises commands that apply conditions when the operation is carried out.

18. The non-transitory computer program product of claim 16, wherein the operating command specifies at least one of:

outputting a list of contents usable in the content recording device;

outputting additional information about content;

playing back content;

ceasing playback of content;

recording content;

specifying playback location in content;

deleting content;

deactivating encryption technologies or digital rights management (DRM) technologies applied to content; and converting a format of the content identifier.

* * * * *